(12) United States Patent
Han et al.

(10) Patent No.: US 12,687,440 B2
(45) Date of Patent: Jul. 21, 2026

(54) FORCE SENSING DEVICE AND FORCE SENSOR

(71) Applicant: Measurement Specialties (China) Ltd., Shenzhen City (CN)

(72) Inventors: Yushan Han, Shenzhen (CN); Qineng Hu, North Shenzhen (CN); Weijun (Davy) Xie, Shenzhen (CN); Xuetang Zhao, Shenzhen (CN); Haijuan Dong, Shenzhen (CN)

(73) Assignee: Measurement Specialties (China) Ltd., Shenzhen City (CN)

( * ) Notice: Subject to any disclaimer, the term of this patent is extended or adjusted under 35 U.S.C. 154(b) by 313 days.

(21) Appl. No.: 18/509,578

(22) Filed: Nov. 15, 2023

(65) Prior Publication Data

US 2024/0159606 A1     May 16, 2024

(30) Foreign Application Priority Data

Nov. 15, 2022     (CN) .......................... 202211429129.5

(51) Int. Cl.
*G01L 1/22*          (2006.01)
(52) U.S. Cl.
CPC ...................................... *G01L 1/22* (2013.01)

(58) Field of Classification Search
CPC . G01L 1/22; G01L 1/2237; G01L 1/26; G01L 1/2268; G01L 9/04; G01L 19/0618
See application file for complete search history.

(56) References Cited

U.S. PATENT DOCUMENTS 3,284,749 A * 11/1966 Fouretier .............. G01L 1/2218
                                                    73/862.622

* cited by examiner

*Primary Examiner* — David Z Huang
(74) *Attorney, Agent, or Firm* — Barley Snyder

(57) ABSTRACT

A force sensing device comprises a top cover, a base, and an elastic body arranged therebetween. The cover includes a sphere and a peripheral edge. The base includes a cylindrical body and a flange for fixing to a housing of a force sensor. An installation hole is formed in the cylindrical body for receiving the sphere. The sphere is rotatable within the hole such that the cover is rotatable relative to the base to a predetermined tilt position when subjected to an off-axis overload. When no load is applied to the cover, the peripheral edge of the cover and the flange of the base are separated by a distance to allow the cover to be moved relative to the base. When the cover is rotated to the predetermined tilt position, the peripheral edge of the cover leans against the flange of the base.

19 Claims, 6 Drawing Sheets

FORCE SENSING DEVICE AND FORCE SENSOR

CROSS-REFERENCE TO RELATED APPLICATION

This application claims the benefit of Chinese Patent Application No. CN202211429129.5 filed on Nov. 15, 2022, in the State Intellectual Property Office of China, the whole disclosure of which is incorporated herein by reference.

FIELD OF THE INVENTION

The present invention relates to a force sensing device and a force sensor comprising the force sensing device.

BACKGROUND

In the prior art, a force sensor typically includes a housing, a top cover, a base, and an elastic body. The base is installed in the housing, and the periphery flange of the base is fixed to a step inside the housing. A central post is formed on the top cover, a cylindrical body is formed on the base, and a central hole is formed in the cylindrical body. The central post on the top cover is inserted into the center hole of the base. The elastic body is compressed between a step surface of the cylindrical body of the base and the inner side of the top wall of the top cover, allowing the top cover to float elastically axially relative to the base.

When an off-axis load is applied on the top cover that deviates from its central axis, there is a tendency for the top cover to deflect. However, due to the gap between the central post on the top cover and the central hole on the base being zero or close to zero, this will hinder the rotation of the top cover relative to the base. Therefore, the off-axis load applied on the top cover will be transmitted to the cylindrical body of the base through the central post of the top cover and to the bottom wall of the base through the cylindrical body. This will result in the strain on the bottom wall far exceeding the maximum strain that the strain gauge attached to the bottom wall can withstand, this will damage the strain gauge and cause the force sensor to fail.

SUMMARY

According to an embodiment of the present disclosure, a force sensing device comprises a top cover, a base, and an elastic body. The top cover includes a sphere and a peripheral edge. The base includes a cylindrical body and a flange for fixing to a housing of a force sensor. An installation hole is formed in the cylindrical body for receiving the sphere. The sphere is rotatable within the installation hole such that the top cover is capable of being rotated relative to the base around the center of the sphere to a predetermined tilt position when subjected to an off-axis overload that deviates from its central axis. The elastic body is compressed between the top cover and the base. When no load is applied to the top cover, a predetermined distance is separated between the peripheral edge of the top cover and the flange of the base to allow the top cover to be moved relative to the base. When the top cover is rotated to the predetermined tilt position, the peripheral edge of the top cover leans against the flange of the base to transmit the off-axis overload to the housing of the force sensor.

BRIEF DESCRIPTION OF THE DRAWINGS

The invention will now be described by way of example with reference to the accompanying Figures, of which.

DETAILED DESCRIPTION OF THE EMBODIMENTS

Figure 1:
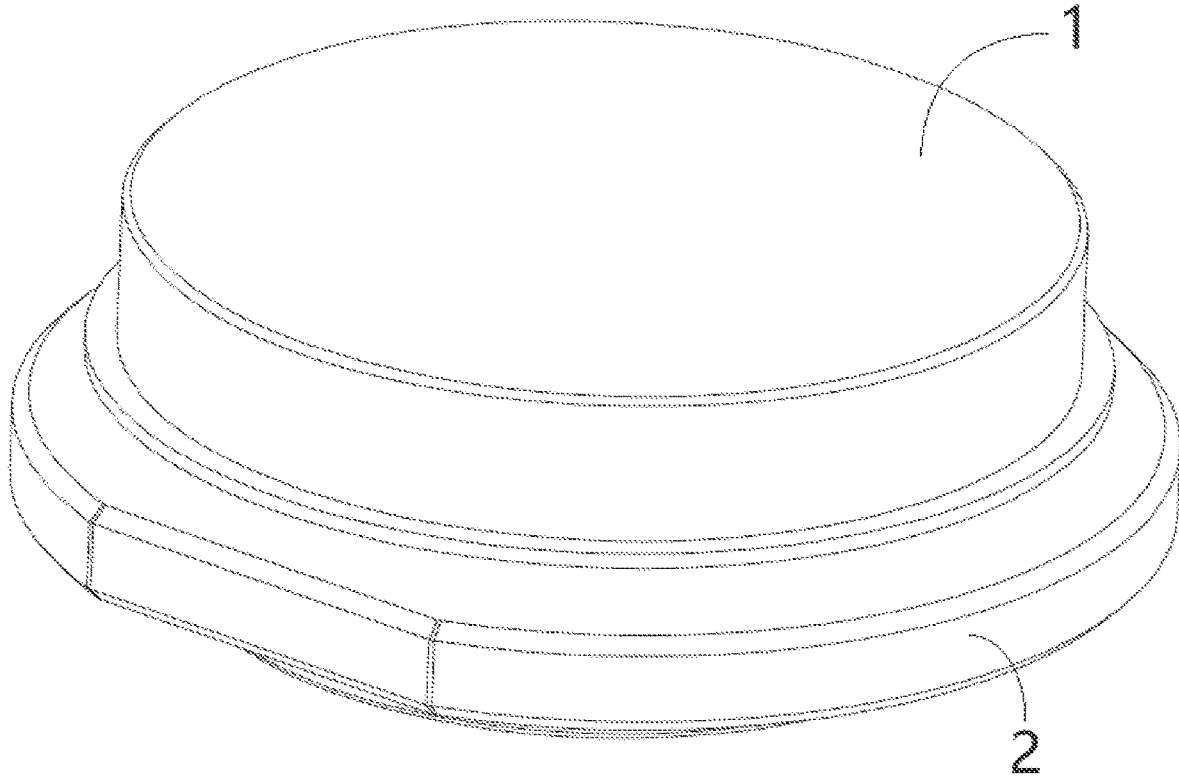
FIG. 1 shows an illustrative perspective view of a force sensing device according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A force sensing device according to an embodiment of the present disclosure includes a top cover comprising a sphere and a peripheral edge, a base comprising a cylindrical body and a flange for fixing to a housing of a force sensor, and an elastic body which is compressed between the top cover and the base. When no load is applied to the top cover, a predetermined distance is separated between the peripheral edge of the top cover and the flange of the base to allow the top cover to be moved relative to the base. An installation hole is formed in the cylindrical body for installing the sphere, and the sphere is rotatable in the installation hole, so that the top cover is capable of being rotated relative to the base around the center of the sphere to a predetermined tilt position when subjected to an off-axis overload that deviates from its central axis. When the top cover is rotated to the predetermined tilt position, the peripheral edge of the top cover leans against the flange of the base to transmit the off-axis overload to the housing of the force sensor.

According to another embodiment of the present invention, a force sensor includes a housing, and the above force sensing device which is installed in the housing. The flange of the base of the force sensing device is fixed to the housing.

Figure 2:
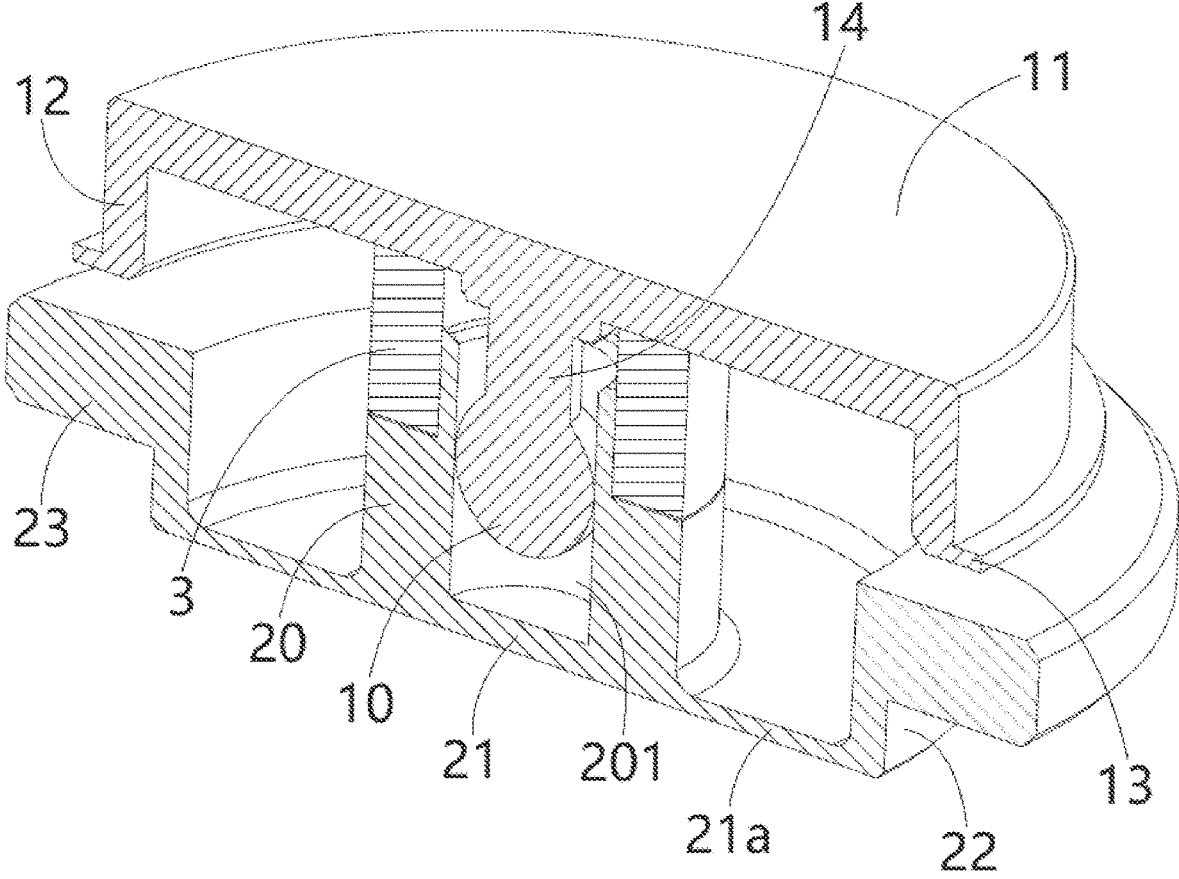
FIG. 2 shows an axial cross-sectional view of a force sensing device according to an exemplary embodiment of the present invention, with the top cover in its initial position.
Figure 3:
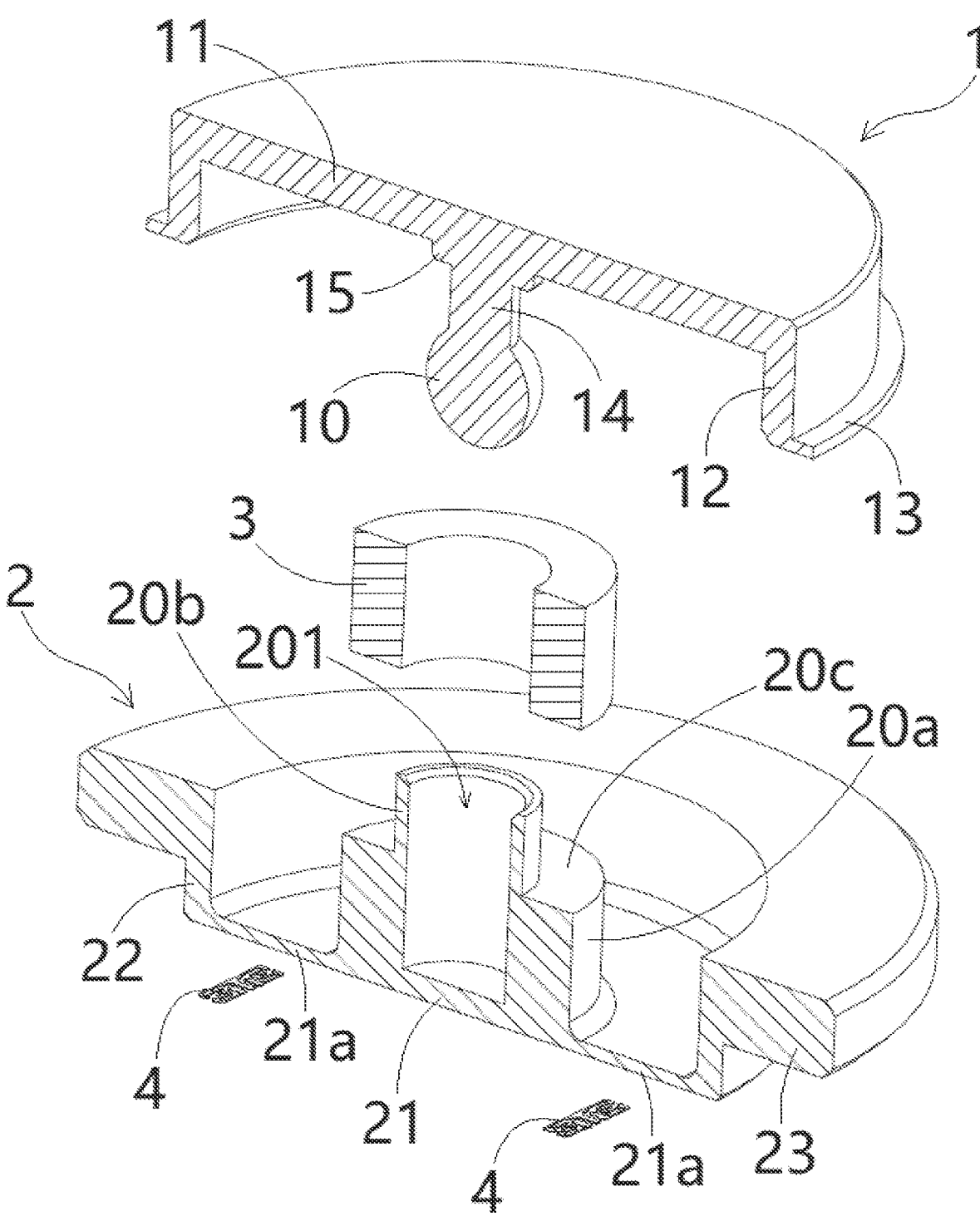
FIG. 3 shows an illustrative exploded view of a force sensing device according to an exemplary embodiment of the present invention.
Figure 4:
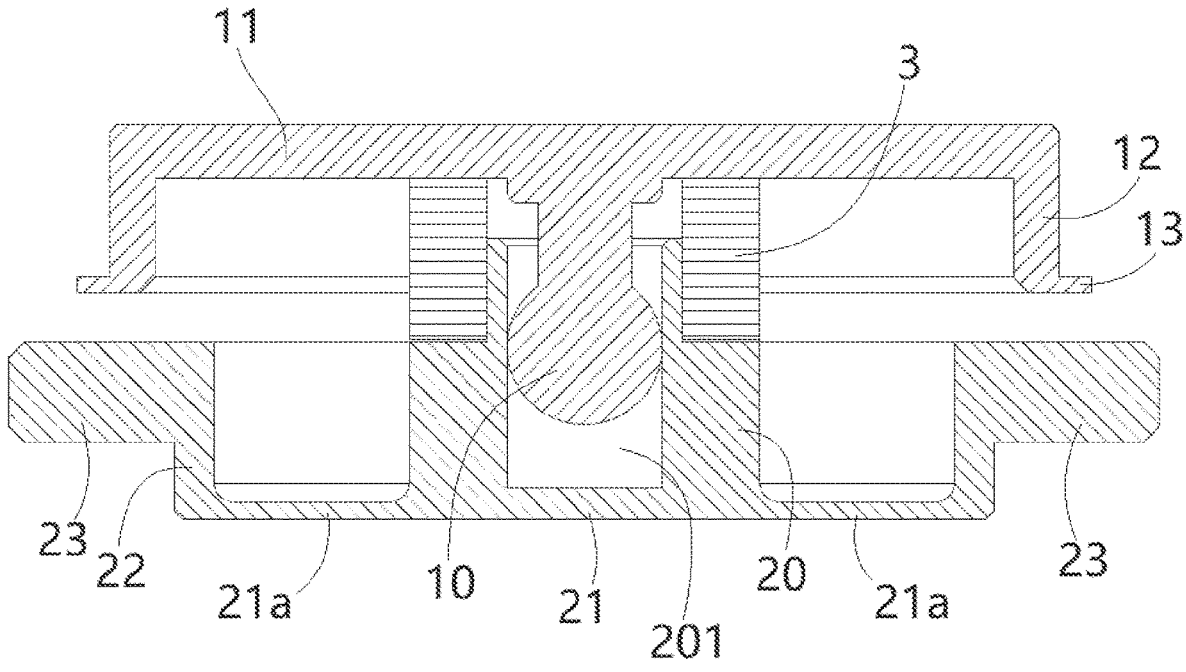
FIG. 4 shows an axial cross-sectional view of a force sensing device according to an exemplary embodiment of the present invention, with the top cover in its initial position.

FIG. 1 is an illustrative perspective view of a force sensing device according to an exemplary embodiment of the present invention. FIG. 2 is an axial cross-sectional view of a force sensing device according to an exemplary embodiment of the present invention, with the top cover 1 in its initial position. FIG. 3 is an illustrative exploded view of a force sensing device according to an exemplary embodiment of the present invention. FIG. 4 shows an axial cross-sectional view of a force sensing device according to an exemplary embodiment of the present invention, with the top cover 1 in its initial position.

As shown in FIGS. 1-4, in an exemplary embodiment of the present invention, a force sensing device is disclosed. The force sensing device includes a top cover 1, a base 2, and an elastic body 3. The top cover 1 includes a sphere 10 and a peripheral edge 13. The base 2 includes a cylindrical body 20 and a flange 23 fixed to the housing of the force sensor. The elastomer 3 is compressed between the top cover 1 and the base 2. When no load is applied to the top cover 1, the top cover 1 is in its initial position. At this point, a predetermined distance is separated between the peripheral edge 13 of the top cover 1 and the flange 23 of the base 2 to allow the top cover 1 to move relative to the base 2.

Figure 5:
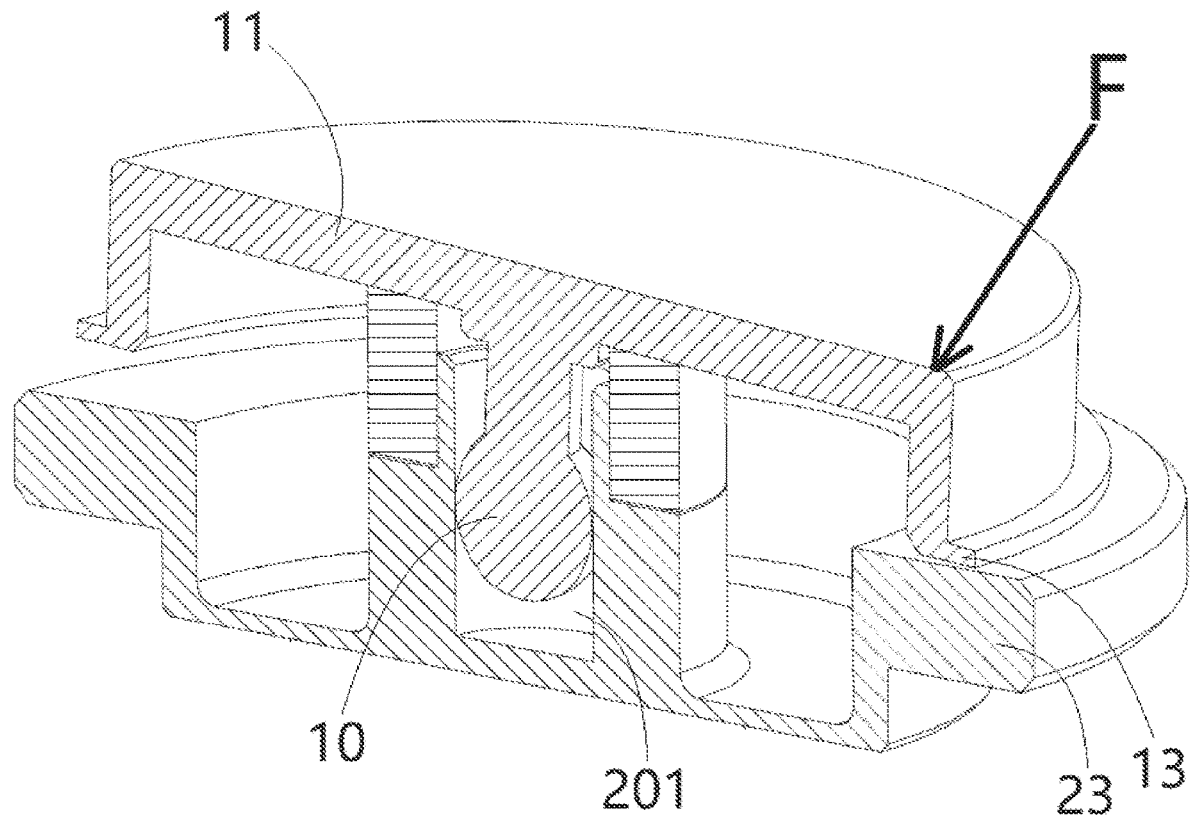
FIG. 5 shows an axial cross-sectional view of a force sensing device according to an exemplary embodiment of the present invention, with the top cover in a predetermined tilt position.
Figure 6:
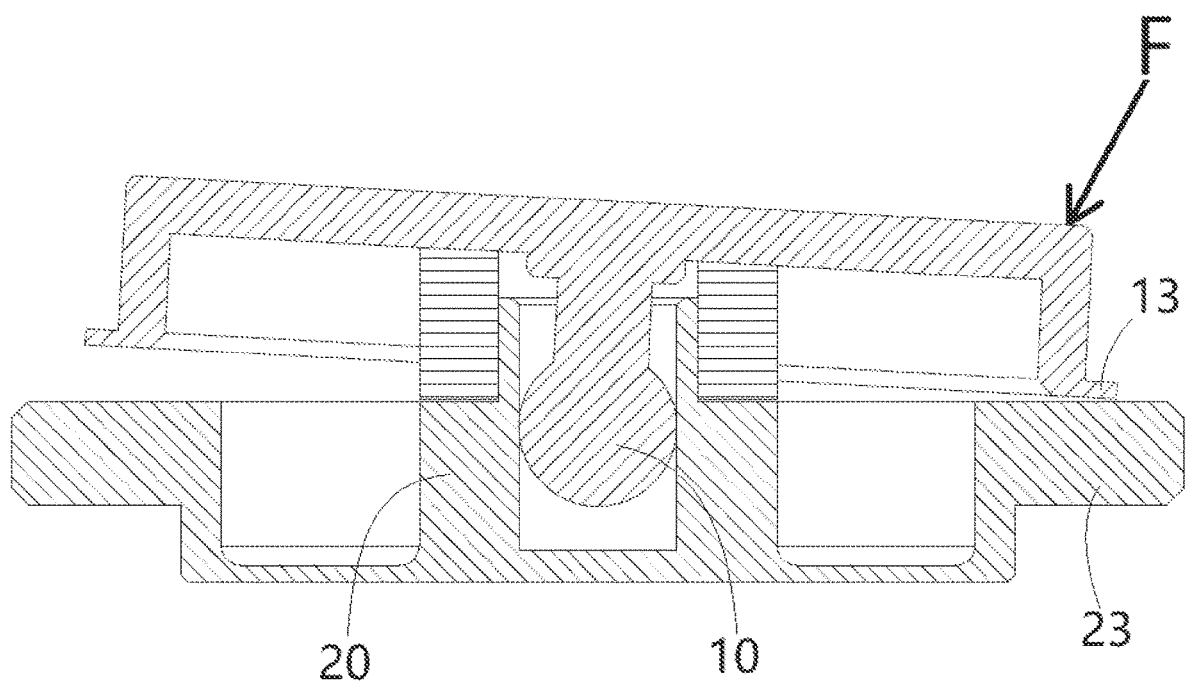
FIG. 6 shows an axial cross-sectional view of a force sensing device according to an exemplary embodiment of the present invention, with the top cover in a predetermined tilt position.

FIG. 5 is an axial cross-sectional view of a force sensing device according to an exemplary embodiment of the present invention, with the top cover 1 in a predetermined tilt position. FIG. 6 is an axial cross-sectional view of a force sensing device according to an exemplary embodiment of the present invention, with the top cover 1 in a predetermined tilt position.

As shown in FIGS. 1-6, in the illustrated embodiments, an installation hole 201 is formed in the cylindrical body 20 for installing the sphere 10, and the sphere 10 can rotate in the installation hole 201, so that the top cover 1 can rotate relative to the base 2 around the center of the sphere 10 to a predetermined tilt position (as shown in FIGS. 5 and 6) when subjected to an off-axis overload F that deviates from its central axis. When the top cover 1 rotates to the predetermined tilt position, the peripheral edge 13 of the top cover 1 presses against the flange 23 of the base 2 to transmit the off-axis overload F to the housing of the force sensor. Therefore, the off-axis overload F applied to the top cover 1 will not be transmitted to the bottom wall 21 of the base 2 through the cylindrical body 20 of the base 2, thereby not causing adverse effects on the strain gauge 4 attached to the bottom wall 21, greatly improving the ability of the force sensor to withstand off-axis overload. For example, the ability to withstand off-axis overload can be increased by at least ten times.

The top cover 1 further includes: a peripheral wall 12, a top wall 11, and a connecting post 14. The top wall 11 is connected to the top of the peripheral wall 12. The connecting post 14 is connected to the top wall 11 and extends downwards from the top wall 11. The sphere 10 is connected to the lower end of the connecting post 14, and the peripheral edge 13 is connected to the outer side of the bottom of the peripheral wall 12. In the illustrated embodiment, the central axis of the top cover 1 coincides with the central axis of the connecting post 14 and the installation hole 201 and passes through the center of the sphere 10.

The diameter of the connecting post 14 is smaller than the diameter of the sphere 10, so that the connecting post 14 will not contact the edge of the top opening of the installation hole 201 during the rotation of the top cover 1 relative to the base 2.

As shown in FIGS. 1 to 6, in the illustrated embodiment, at least a portion of the connecting post 14 extends into the installation hole 201 of the base 2. In order to improve the connection strength between the connecting post 14 and the top wall 11, in the illustrated embodiment, a locally raised convex portion 15 is formed on the inner side of the top wall 11, and the upper end of the connecting post 14 is connected to the convex portion 15.

As shown in FIGS. 1 to 6, in the illustrated embodiment, the diameter of the sphere 10 is equal to or slightly smaller than the inner diameter of the installation hole 201. This ensures that the central axis of top cover 1 coincides or roughly coincides with the central axis of base 2, thereby ensuring good coaxiality between the two.

As shown in FIGS. 1 to 6, in the illustrated embodiments, the outer surface of the sphere 10 and/or the inner surface of the installation hole 201 are smooth surfaces, which can reduce the friction between the two and prevent the load from being transmitted from the sphere 10 to the inner wall of the installation hole 201.

As shown in FIGS. 1 to 6, in the illustrated embodiment, the base 2 further comprises a circumferential wall 22 and a bottom wall 21. The bottom wall 21 is connected to the bottom of the circumferential wall 22. The cylindrical body 20 is connected to the bottom wall 21 and extends upwards from the bottom wall 21, and the flange 23 is connected to the outer side of the top of the circumferential wall 22.

As shown in FIGS. 1 to 6, in the illustrated embodiment, the cylindrical body 20 includes a first cylindrical part 20*a* and a second cylindrical part 20*b*. The lower end of the first cylindrical part 20*a* is connected to the bottom wall 21. The lower end of the second cylindrical part 20*b* is connected to the upper end of the first cylindrical part 20*a*. The diameter of the first cylindrical part 20*a* is greater than the diameter of the second cylindrical part 20*b*, so that the upper end face 20*c* of the first cylindrical part 20*a* extends radially beyond the outer peripheral surface of the second cylindrical part 20*b*. The first cylindrical part 20*a* and the second cylindrical part 20*b* are coaxial, and the installation hole 201 runs axially through the first cylindrical part 20*a* and the second cylindrical part 20*b*.

As shown in FIGS. 1 to 6, in the illustrated embodiments, the elastic body 3 is in a hollow cylindrical shape, and the second cylindrical part 20*b* of the cylindrical body 20 is inserted into the center through hole of the elastic body 3 in an interference fit manner. The lower end of the elastic body 3 is against the upper end face 20*c* of the first cylindrical part 20*a*, and the upper end of the elastic body 3 is against the inner side of the top wall 11.

As shown in FIGS. 1 to 6, in the illustrated embodiments, the bottom wall 21 includes a thin-walled part 21*a* located between the cylindrical body 20 and the circumferential wall 22. The thickness of the thin-walled part 21*a* is smaller than the thickness of the other part of the bottom wall 21 except for the thin-walled part 21*a*, resulting in elastic deformation of the thin-walled part 21*a* when subjected to load.

As shown in FIGS. 1 to 6, in another exemplary embodiment of the present invention, a force sensor is also disclosed. The force sensor includes a housing (not shown) and the aforementioned force sensing device. The force sensing device is installed in the housing. The flange 23 of the base 2 of the force sensing device is supported and fixed to a support step inside the housing.

As shown in FIGS. 1 to 6, in the illustrated embodiments, the force sensor further includes a strain gauge 4 attached to the bottom surface of the thin-walled part 21*a* of the bottom wall 21 of the base 2 for detecting the strain of the thin-walled part 21*a*. The strain gauge 4 can be a resistive strain gauge.

As shown in FIGS. 1 to 6, in the illustrated embodiments, the force sensor further includes a circuit board (not shown), which is installed in the housing and electrically connected to strain gauge 4, for converting the strain detected by strain gauge 4 into a corresponding electrical signal, such as a voltage signal.

As shown in FIGS. 1 to 6, in the illustrated embodiments, the force sensor further includes a signal terminal (not shown), which is electrically connected to the circuit board and extends out of the housing to output the electrical signal corresponding to the strain, so that the load applied to the top cover 1 can be calculated based on the output electrical signal.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A force sensing device, comprising:
   a top cover comprising:
      a sphere;
      a peripheral edge;
      a peripheral wall;
      a top wall which is connected to the top of the peripheral wall; and
      a connecting post which is connected to the top wall and extends downwards from the top wall, the sphere is connected to a lower end of the connecting post, and the peripheral edge is connected to the outer side of the bottom of the peripheral wall;
   a base comprising a cylindrical body and a flange for fixing to a housing of a force sensor, an installation hole is formed in the cylindrical body for receiving the sphere, the sphere being rotatable within the installation hole such that the top cover is capable of being rotated relative to the base around the center of the sphere to a predetermined tilt position when subjected to an off-axis overload that deviates from its central axis; and

an elastic body which is compressed between the top cover and the base, wherein:
   when no load is applied to the top cover, a predetermined distance is separated between the peripheral edge of the top cover and the flange of the base to allow the top cover to be moved relative to the base; and
   when the top cover is rotated to the predetermined tilt position, the peripheral edge of the top cover leans against the flange of the base to transmit the off-axis overload to the housing of the force sensor.

2. The force sensing device according to claim 1, wherein the central axis of the top cover coincides with the central axis of the connecting post and the installation hole and passes through the center of the sphere.

3. The force sensing device according to claim 2, wherein the diameter of the connecting post is smaller than the diameter of the sphere and the connecting post is adapted such that it will not come into contact with an edge of a top opening of the installation hole during the rotation of the top cover relative to the base.

4. The force sensing device according to claim 1, wherein at least a portion of the connecting post extends into the installation hole of the base.

5. The force sensing device according to claim 4, wherein a convex portion is formed on the inner side of the top wall, and the upper end of the connecting post is connected to the convex portion.

6. The force sensing device according to claim 1, wherein the diameter of the sphere is equal to or smaller than the inner diameter of the installation hole.

7. The force sensing device according to claim 1, wherein at least one of the outer surface of the sphere or the inner surface of the installation hole are smooth surfaces.

8. The force sensing device according to claim 1, wherein the base further comprises:
   a circumferential wall; and
   a bottom wall which is connected to the bottom of the circumferential wall.

9. The force sensing device according to claim 8, wherein the cylindrical body is connected to the bottom wall and extends upwards from the bottom wall, and the flange is connected to the outer side of the top of the circumferential wall.

10. The force sensing device according to claim 9, wherein the cylindrical body comprises:
   a first cylindrical part, a lower end of which is connected to the bottom wall; and
   a second cylindrical part, a lower end of which is connected to the upper end of the first cylindrical part.

11. The force sensing device according to claim 10, wherein:
   the diameter of the first cylindrical part is greater than the diameter of the second cylindrical part, so that the upper end face of the first cylindrical part extends radially beyond the outer peripheral surface of the second cylindrical part; and
   the first cylindrical part and the second cylindrical part are coaxial, and the installation hole runs axially through the first cylindrical part and the second cylindrical part.

12. The force sensing device according to claim 11, wherein the elastic body is in a hollow cylindrical shape, and the second cylindrical part of the cylindrical body is inserted into a central through-hole of the elastic body in an interference fit manner.

13. The force sensing device according to claim 12, wherein the lower end of the elastic body is against the upper end face of the first cylindrical part, and the upper end of the elastic body is against the inner side of the top wall.

14. The force sensing device according to claim 11, wherein the bottom wall includes a thin-walled part located between the cylindrical body and the circumferential wall, and the thickness of the thin-walled part is smaller than the thickness of the other part of the bottom wall except for the thin-walled part, causing the thin-walled part to undergo elastic deformation when subjected to load.

15. A force sensor, comprising:

a housing;

a force sensing device, including:

a top cover comprising a sphere and a peripheral edge;

a base comprising a cylindrical body having a circumferential wall, a bottom wall and a flange fixing the device to the housing, an installation hole is formed in the cylindrical body for receiving the sphere, the sphere being rotatable within the installation hole such that the top cover is capable of being rotated relative to the base around the center of the sphere to a predetermined tilt position when subjected to an off-axis overload that deviates from its central axis; and an elastic body which is compressed between the top cover and the base, wherein:

when no load is applied to the top cover, a predetermined distance is separated between the peripheral edge of the top cover and the flange of the base to allow the top cover to be moved relative to the base; and when the top cover is rotated to the predetermined tilt position, the peripheral edge of the top cover leans against the flange of the base to transmit the off-axis overload to the housing of the force sensor; and a strain gauge which is attached to a bottom surface of a thin-walled part of the bottom wall of the base for detecting the strain of the thin-walled part.

16. The force sensor according to claim 15, further comprising:

a circuit board installed in the housing and electrically connected to the strain gauge for converting the strain detected by the strain gauge into a corresponding electrical signal.

17. The force sensor according to claim 16, further comprising a signal terminal, which is electrically connected to the circuit board and extends out of the housing.

18. The force sensor according to claim 17, wherein the signal terminal is used to output the electrical signal corresponding to the strain, so as to calculate the load applied to the top cover based on the output electrical signal.

19. A force sensing device, comprising:

a top cover comprising a sphere and a peripheral edge;

a base comprising:

a circumferential wall;

a bottom wall which is connected to the bottom of the circumferential wall; and a cylindrical body and a flange for fixing to a housing of a force sensor, an installation hole is formed in the cylindrical body for receiving the sphere, the sphere being rotatable within the installation hole such that the top cover is capable of being rotated relative to the base around the center of the sphere to a predetermined tilt position when subjected to an off-axis overload that deviates from its central axis; and an elastic body which is compressed between the top cover and the base, wherein:

when no load is applied to the top cover, a predetermined distance is separated between the peripheral edge of the top cover and the flange of the base to allow the top cover to be moved relative to the base; and when the top cover is rotated to the predetermined tilt position, the peripheral edge of the top cover leans against the flange of the base to transmit the off-axis overload to the housing of the force sensor, wherein the cylindrical body is connected to the bottom wall and extends upwards from the bottom wall, and the flange is connected to the outer side of the top of the circumferential wall.

\* \* \* \* \*